United States Patent [19]

Nagashima et al.

[11] Patent Number: 4,644,584
[45] Date of Patent: Feb. 17, 1987

[54] PATTERN POSITION DETECTING APPARATUS

[76] Inventors: Sumio Nagashima, 2-114-7, Ushioda-cho, Tsurumi-ku; Etsuji Suzuki, 2580-10, Nakano-cho, Totsuka-ku, both of Yokohama-shi; Kiyomu Chiyoda, 1-1-3, Teraokita, Ayase-shi, Kanagawa-ken; Masahiro Kodama, 1-25-4-405, Deiki, Kanazawa-ku, Yokohama-shi, all of Japan

[21] Appl. No.: 495,128

[22] Filed: May 16, 1983

[30] Foreign Application Priority Data

May 19, 1982 [JP] Japan ................................. 57-84316

[51] Int. Cl.⁴ ............................................. G06K 9/62
[52] U.S. Cl. ........................................... 382/34; 382/8; 382/48; 382/56
[58] Field of Search ................... 382/57, 34, 48, 45, 382/56, 8

[56] References Cited

U.S. PATENT DOCUMENTS 3,781,855 12/1973 Killen ..................................... 382/4
4,288,816 9/1981 Kashioka et al. ..................... 382/56
4,334,241 6/1982 Kashioka et al. ..................... 382/45

FOREIGN PATENT DOCUMENTS 3013833 10/1980 Fed. Rep. of Germany .
3014629 10/1980 Fed. Rep. of Germany .

Primary Examiner—Leo H. Boudreau

[57] ABSTRACT

A pattern position detecting apparatus has an ITV camera for receiving the image of a pattern of the IC chip and a memory for storing therein the image signal from the ITV camera as a pattern data. When the pattern data is read out from the memory, a pattern section is shifted every second picture-element array in the horizontal and vertical directions and the picture elements are picked up every second picture element from the pattern section. The pattern data corresponding to the pattern sections read out from the memory are compared with reference pattern data, whereby determination is made of the degree of coincidence between both of the patterns. After determination has been made of the degrees of coincidence with respect to the whole pattern, detection is made of the position of the pattern section having the highest degree of coincidence among said degrees of coincidence in accordance with the address of the memory.

4 Claims, 15 Drawing Figures

PATTERN POSITION DETECTING APPARATUS

BACKGROUND OF THE INVENTION

This invention relates to a pattern position detecting apparatus for detecting the position of a specified pattern section of a particular pattern on an object.

In the manufacture of an IC (Integrated Circuit), the IC wafer is cut into a plurality of IC chips and bonding is carried out to the IC chip, so it is necessary to detect the cutting or bonding position. Conventionally, this position detection is carried out as follows. A pattern region including the pattern to be detected is photographed by, for example, an industrial television camera. The pattern image signal from the television camera is digitalized and stored in a memory. The pattern data corresponding to a specified region are sequentially read out from this memory while they are shifted bit by bit. The read out pattern section data are compared with a reference pattern corresponding to the pattern to be detected. In this comparison, the degree of coincidence between the read out pattern section data and the reference pattern data is detected and, from the memory address for the pattern data having the highest degree of coincidence the pattern position corresponding to this pattern data is detected.

However, since in the above-mentioned conventional pattern position detecting apparatus, the position detecting operation is carried out while the pattern section data are shifted bit by bit, a large amount of time is required for position detection. For example, where the pattern section data are composed of $64 \times 64$ bits and the stored pattern data are composed of $128 \times 128$ bits, the number of interruptions between the pattern section data and the reference pattern data concerned is $64 \times 64 \times 65 \times 65 = 17,305,600$. As can be seen, a considerable amount of time is required for the position detection.

SUMMARY OF THE INVENTION

The object of the present invention is to provide a pattern position detecting apparatus which is capable of shortening the time required for comparison of the patterns concerned, thereby increasing the speed with which the position detection is carried out.

According to the invention, there are provided an image pick-up device for receiving the image of a pattern to be examined, a memory for storing pattern data corresponding to the pattern to be detected which is picked-up by the image pick-up device, and an addressing means for designating the address of the memory for the purpose of reading from the memory pattern section data included in a specified region smaller than that constituted by the pattern to be examined. The address-designation operation of the addressing means is carried out so that, while the pattern section is shifted at least every second picture-element column and row in the horizontal and vertical directions, the pattern data included in the pattern sections thus shifted may be read out in sequential order. The pattern section data read out and the reference pattern data concerned are respectively compared and the degree of coincidence between each pattern section and the reference pattern is calculated. Thus, the pattern section closest to the reference pattern is detected from the degrees of coincidence calculated with respect to all the pattern sections. The pattern position is detected from the addresses corresponding to the pattern section thus detected.

DETAILED DESCRIPTION OF THE PREFERRED EMBODIMENTS

Figure 1:
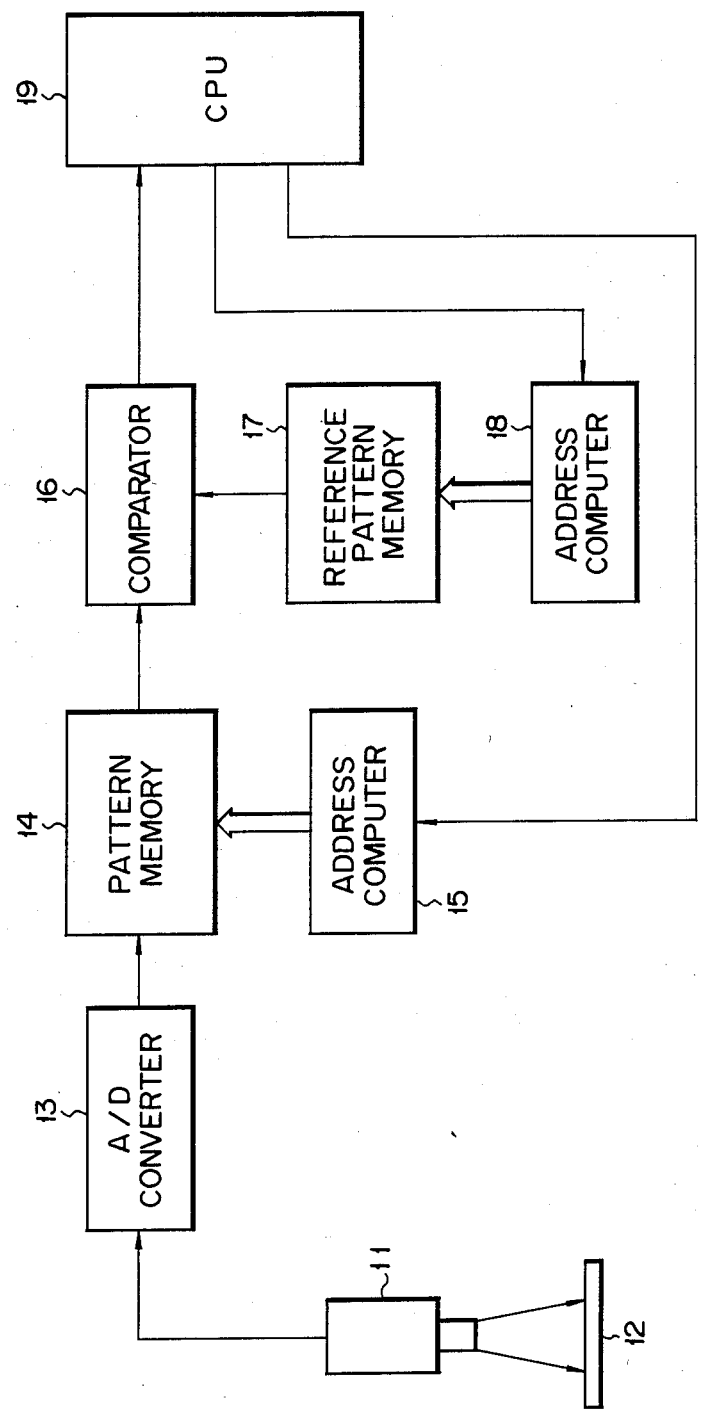
FIG. 1 is a block circuit diagram of a pattern position detecting apparatus in accordance with an embodiment of the invention.

Referring to FIG. 1, an image pick-up device, e.g. an industrial television (ITV) camera 11 is so disposed as to photograph a predetermined pattern region of an object having a pattern to be detected, e.g. an IC wafer or chip 12 including the pattern corresponding to bonding pads or print wires thereof, for example. The output portion of the ITV camera 11 is connected, through a binary coding circuit 13, to a write-in port of a pattern memory 14 having a bit capacity of, for example, $256 \times 256$ bits. The output portion of an address computer 15 is connected to an addressing port of this pattern memory 14. The output port of the pattern memory 14 is connected to one input terminal of a comparator 16, to the other input terminal of which there is connected the output portion of a reference pattern memory 17. An address computer 18 is connected to the addressing port of the reference memory 17. The output portion of the comparator 16 is connected to a central processing unit (CPU) 19. The CPU 19 is connected to the address computers 15 and 18.

Figure 2:
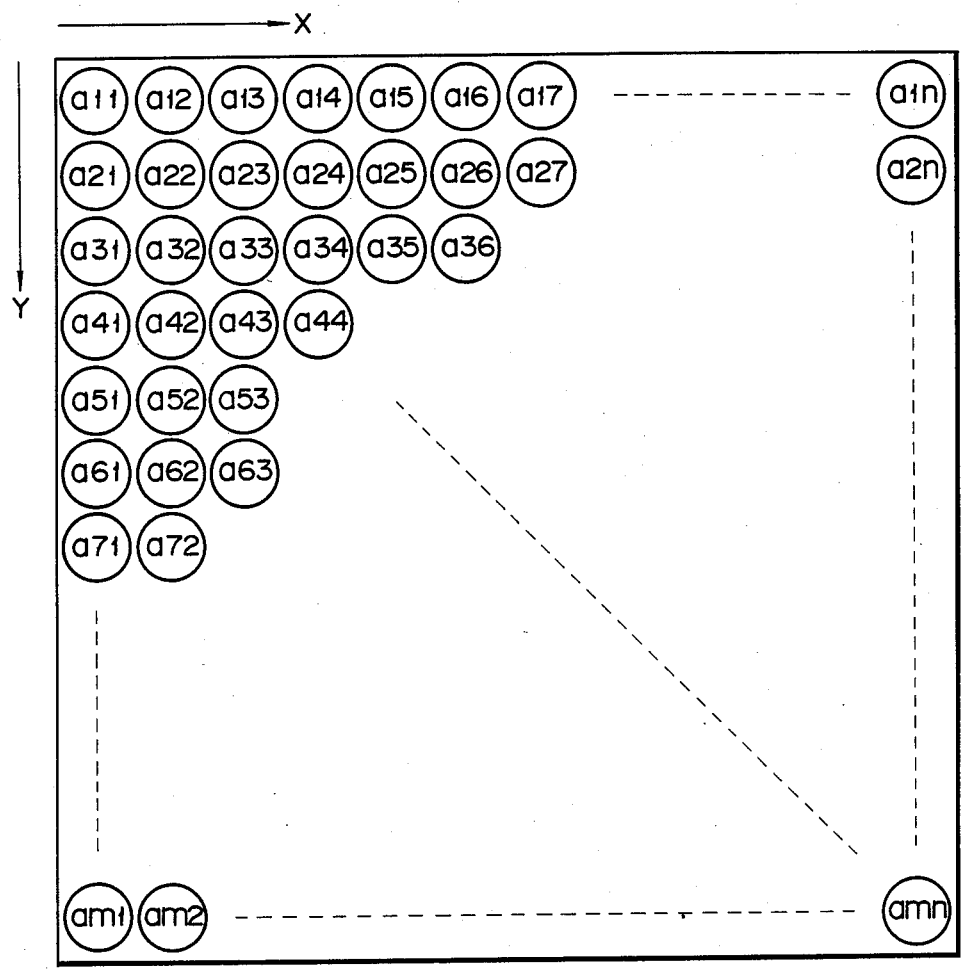
FIG. 2 is a view showing an array of picture elements corresponding to the pattern data bits stored in the pattern memory of FIG. 1.
Figure 3:
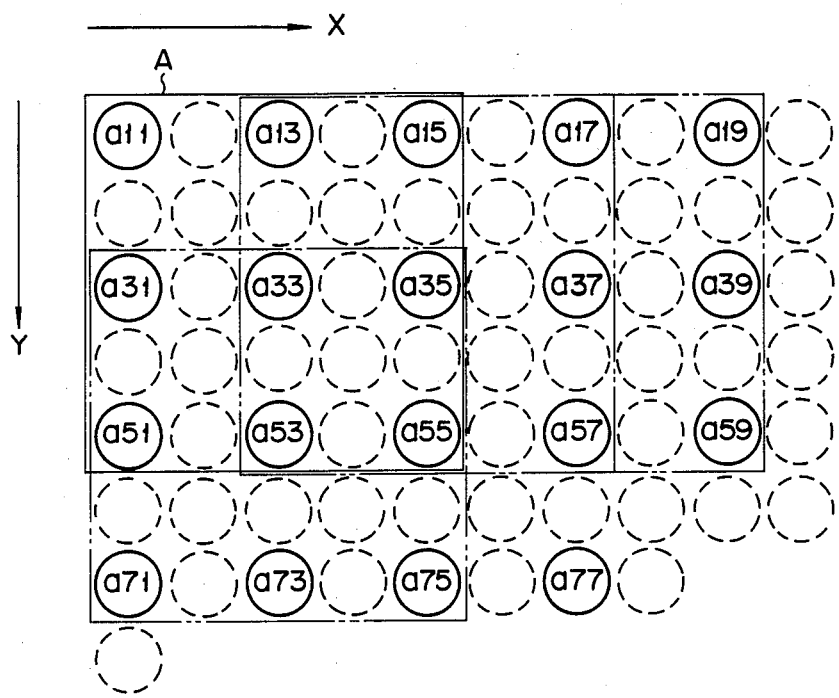
FIG. 3 is a view showing a pattern of picture-element arrangement for explaining the read-out of a pattern section A of odd-column and -row bits.
Figure 4:
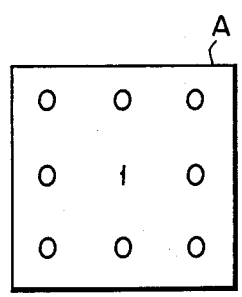
FIG. 4 shows a bit arrangement of the odd-column and -row bit pattern section A read out.
Figure 5:
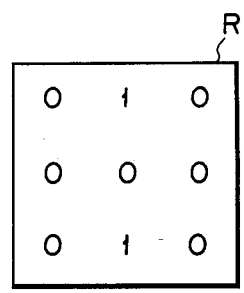
FIG. 5 is the bit arrangement of a reference bit pattern R.
Figure 6:
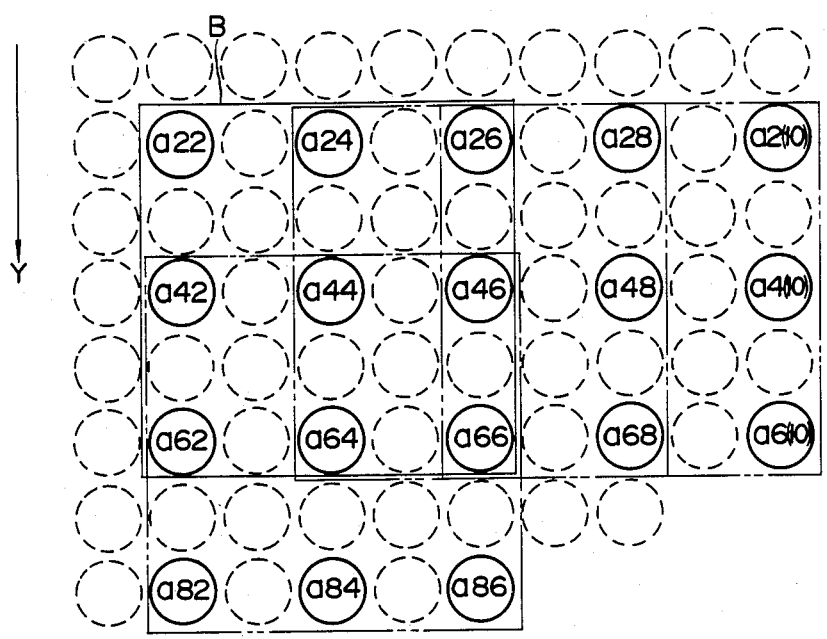
FIG. 6 is a view showing a pattern of picture-element arrangement for explaining the read-out of a pattern section B of even-column and -row bits.

In the pattern position detecting apparatus shown in FIG. 1, when a photograph is taken of the predetermined pattern region of the IC chip 12 by means of the ITV camera 11, this camera 11 produces an image signal corresponding to the pattern of the predetermined pattern region. This image signal is converted by an analog-to-digital converter 13 into digital pattern data and is inputted into the pattern memory 14 and then stored therein. In FIG. 2, there are shown, in the form of a matrix, the picture elements a11, a12, a13, ..., amn stored in the pattern memory 14. The pattern data bits corresponding to these picture elements are read out in accordance with the address data of the address computer 15. In this case, as shown in FIG. 3, the pattern data bits are read out from the pattern memory 14 in such a manner that a pattern section A composed of 5×5 bits is shifted in the horizontal direction X and in the vertical direction Y. The address computer 15 carries out the address computation in accordance with the following formulae (1) and (2) for the purpose of performing the above-mentioned reading operation.

$$a\{(1+2i), (1+2j)\} \quad (1)$$

$$a\{(2+2i), (2+2j)\} \quad (2)$$

where $i$ ($=0, 1, 2, 3, \ldots$) represents the factor causing a shift of the pattern section A in the horizontal direction X and $j$ ($=0, 1, 2, 3, \ldots$) represents the factor causing a shift of the pattern section A in the vertical direction Y. These factors $i$ and $j$ are supplied from CPU 19 to the address computer 15. When the factors $i=0, 1, 2$, and $j=0, 1, 2$ are supplied to the address computer 15, this computer carries out the computation concerning the formula (1), with the result that the pattern data bits corresponding to the picture elements a11, a13, a15, a31, a33, a35, a51, a53 and a55 are read out and then are supplied to the comparator 16. Since reference pattern data bits are supplied to this comparator 16 from the reference pattern memory 17, the pattern data bits of the pattern memory 14 are compared with those reference pattern data bits, respectively.

The reference pattern memory 17 is stored with reference pattern data corresponding to a large number of reference patterns and, in accordance with the address data from the address computer 18, supplies the reference pattern data to the comparator 16. In the comparator 16, comparison is made between the pattern of the read-out pattern section A and the reference pattern R. In both the patterns A and R, it is 6 bits that indicate coincidence among the 9 bits of each pattern. The result of this comparison is inputted into CPU 19. CPU 19 stores the data of this comparison result as a degree 6 of coincidence. Next, when CPU 19 supplies the factors $i=0, 1, 2, j=1, 2, 3$ to the address computer 15, the pattern data bits corresponding to the picture elements a13, a15, a17, a33, a35, a37, a53, a55 and a57 of the pattern section shifted two bits in the horizontal direction from the pattern section A of FIG. 3 are read out from the pattern memory 14 and then are inputted into the comparator 16 and then are compared with the reference pattern data bits. The data of this comparison result are stored in CPU 19. In this way, the pattern section is sequentially shifted in the horizontal direction and the pattern of the shifted pattern section is compared with the reference pattern, whereby the degree of coincidence is computed. When the rightward end of the pattern section arrives at the 256th bit on the horizontal bit arrangement, CPU 19 supplies the factors $i=1, 2, 3$, and $j=0, 1, 2$ to the address computer 15. In this case, the pattern data corresponding to the pattern section B prepared by shifting the pattern section A by two-bit rows in the vertical direction Y are read out from the pattern memory 14, whereby a similar comparing operation is carried out. The pattern of the pattern section B thus shifted by two bit-rows is sequentially shifted by two bit-rows in the horizontal direction, whereby a similar comparing operation is carried out.

As mentioned above, the pattern of the pattern section is compared with the reference pattern while that pattern section is sequentially shifted in the horizontal and vertical directions X and Y until pattern comparison is completed with respect to all pattern sections possible with 256×256 bits. Upon completion of this comparison, the address computer 15 is so set as to make address computation in accordance with the formula (2) arranged to address the even-column and -row data bits. In this case, the pattern data corresponding to the pattern section B prepared by a shift of the pattern section A, by one bit-column and one bit-row, in the horizontal and vertical directions X and Y are read out from the pattern memory 14. This pattern section B, as in the case of the pattern section A composed of the odd-column and -row data bits, are compared with the reference pattern in such a manner that section B is shifted in the horizontal and vertical directions X and Y.

Upon completion of the above comparison between each of the odd-column and -row bit pattern section A and even-column and -row bit pattern sections B and the reference pattern R, the CPU 19 looks for the highest-degree-of-coincidence data from among the degree-of-coincidence data obtained by such comparison. In this case, the CPU 19 detects the highest degree of coincidence in the odd-column and -row bit pattern sections A and the highest degree of coincidence in the even-column and -row bit pattern sections B, and compares both for the highest degrees of coincidence. When the difference therebetween is not less than a specified value, one of the two highest degree-of-coincidence pattern sections A and B or the one which is greater than the other is regarded as the pattern section corresponding to the pattern to be detected. The position of the pattern section A or B having this highest degree of coincidence is detected from the address of the pattern memory 14. When the difference between the two highest degrees of coincidence is below the specified value, an intermediate position between the pattern sections A and B is regarded as the position to be detected.

Figure 7:
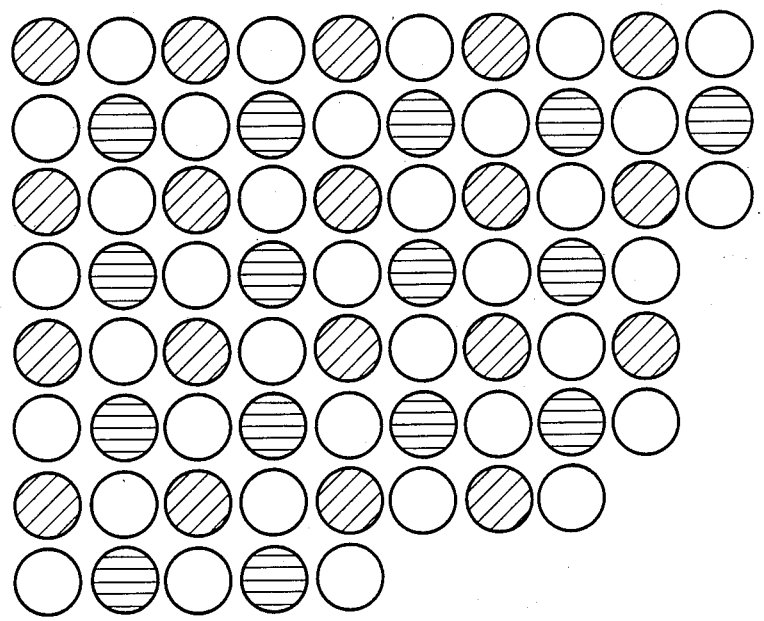
FIG. 7 is a view showing the formation of pattern resulting from the performance of the shift-reading operation in accordance with FIGS. 3 and 6.

When the pattern position is looked for while the odd-column and -row bit pattern section A and the even-column and -row bit pattern section B are shifted, as shown in FIG. 7, the picture elements are detected every second element for comparison. According to this position detecting method, therefore, the frequency of the processing operations for position detection is reduced to half the frequency of those carried out with respect to all picture elements as in the prior art. It is thus possible to increase the speed of the position detection correspondingly. For convenience in this embodiment, explanation is made, on the assumption that the pattern section is composed of 5×5 bits. In practice, however, position detection is made in accordance with the bit pattern of 32×32 bits. Where the desired pattern is detected from the pattern of 256×256 bits in accordance with the bit pattern of 32×32 bits, the frequency of comparing the read-out patterns and the reference pattern is $(128-32)\times(128-32)\times2=18,432$. In contrast, when position detection is made by using the conventional position detecting method arranged to pick up all picture elements in accordance with the pattern of $64\times64$ bits, the frequency of comparison is $(256-64)\times(256-64)=36,864$. That is, the invention only requires half the detecting time necessary for the prior art position detecting method, and the detecting speed of the invention is twice as high.

Note here that, although, according to the above-mentioned position detecting method, the density of the picture elements picked up becomes low, the precision of detection decreases very little and no inconvenience arises insofar as detection is made of the pattern section somewhat larger than that corresponding to a low picture-element density.

In the above-mentioned embodiment, the picture elements are picked up obliquely with respect to the picture screen as shown in FIG. 7. For example, where, detection is made of the pattern having vertical and lateral lines such as a bonding electrode of the IC chip, it is possible to detect every one of both the directional components, thereby enabling reliable position detection.

Figure 8:
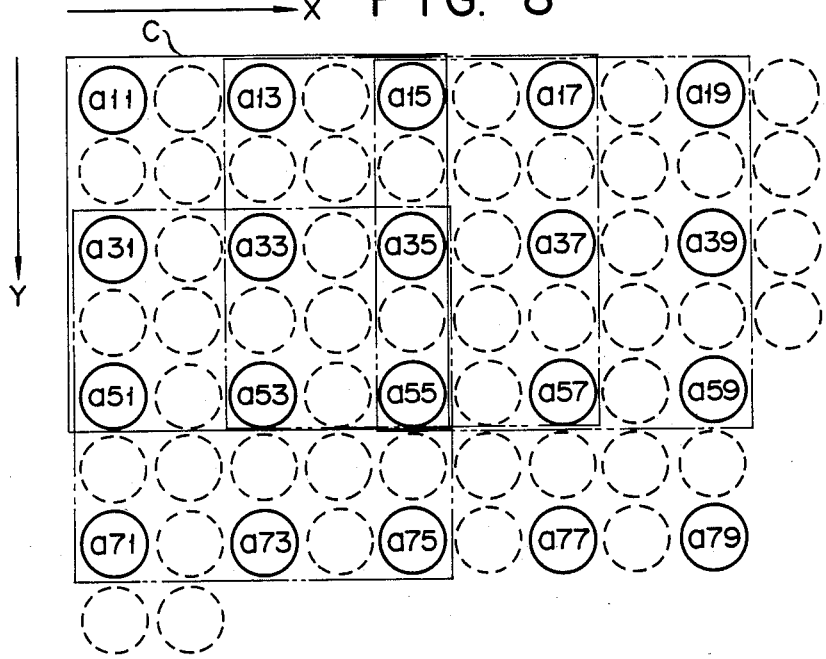
FIGS. 8 and 9 are views showing, respectively, a pattern section C of odd-column and -row bits and a pattern section D of even-column and -row bits which are read out in accordance with another embodiment of the invention.
Figure 9:
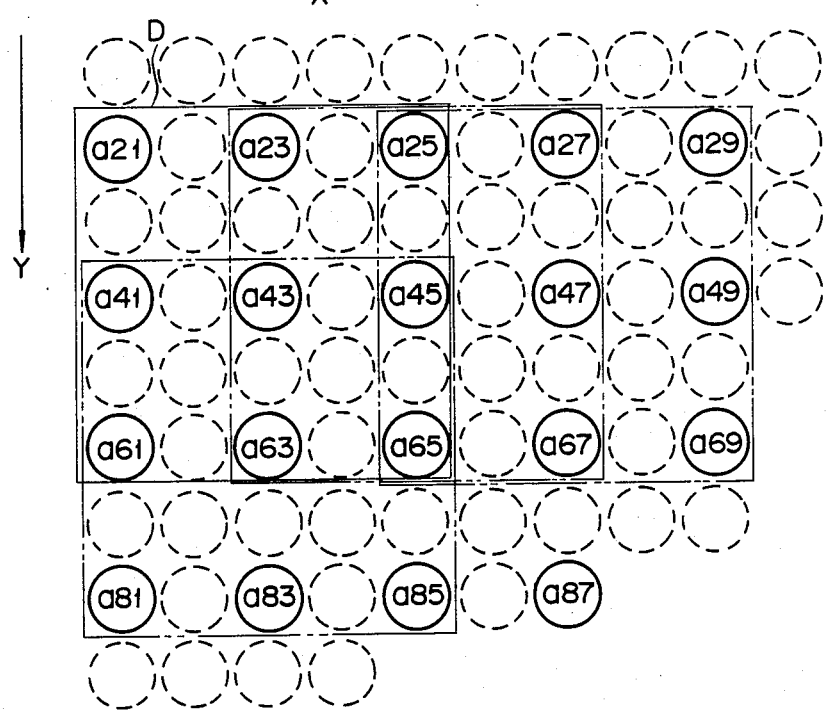
Figure 10:
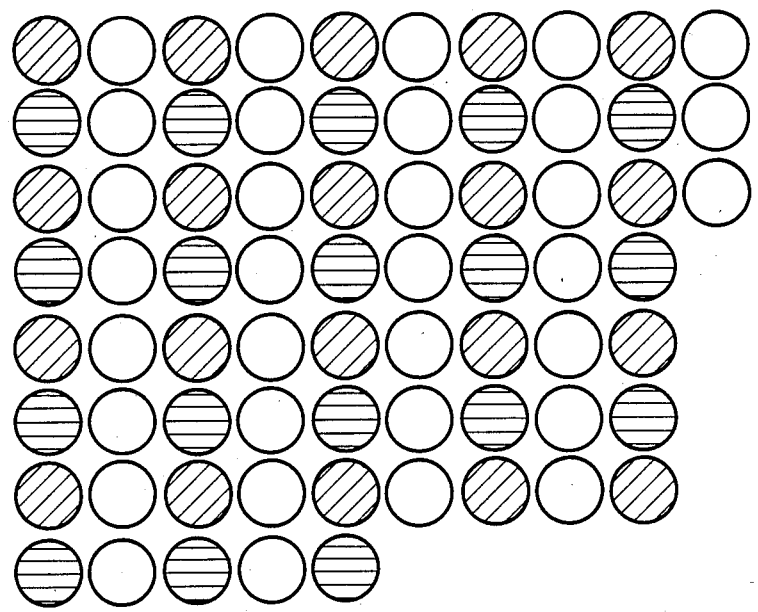
FIG. 10 is a view showing the formation of pattern resulting from the performance of the shift-reading operation in accordance with FIGS. 8 and 9.

Reference will now be made to another embodiment of the invention by the use of FIGS. 8, 9 and 10. According to this second embodiment, the odd-column and -row bit pattern section C and the even-column and -row bit pattern section D are picked up in accordance with the following formulae (3) and (4).

$$a\{(1+2i), (1+2j)\} \quad (3)$$

$$a\{(2+2i), (1+2j)\} \quad (4)$$

That is, picking-up of the odd-column and -row bit pattern section C is effected in such a manner that pattern section is sequentially shifted in the horizontal direction X and vertical direction Y as in the case of the odd-column and -row bit pattern section A of FIG. 3. On the other hand, the even-column and -row bit pattern section D is sequentially shifted, from the position prepared by shifting the odd-column and -row bit pattern section C by one bit-row in the vertical direction Y, in the horizontal direction X and vertical direction Y. In this case, the i and j factors are supplied from CPU 19 to the address computer 15 as well and the address designation of the pattern memory 14 is affected causing the pattern sections C and D to be read out from the pattern memory 14. When all pattern sections possible with $256\times256$ bits are read out in accordance with the formulae (3) and (4), the formation of the pattern thus read out is, as shown in FIG. 10, such that the array of picture elements in the vertical direction Y, or the picture element columns, is arranged every second column position. Since the detection of pattern position in such a pattern formation makes the density of the read-out picture elements uniform in the vertical direction Y, it is possible to reliably detect the linear pattern particularly in the vertical direction Y. The method of detecting the pattern position according to this embodiment, therefore, is effective in detecting the dicing of an IC wafer.

Figure 11:
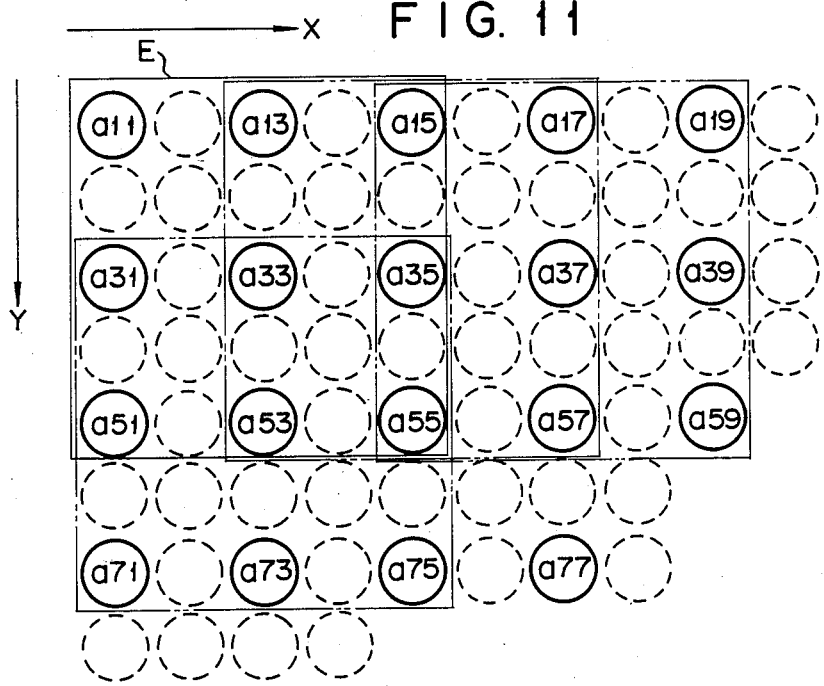
FIGS. 11 and 12 are views showing, respectively, a pattern section E of odd-column and -row bits and a pattern section F of even-column and -row bits which are read out in accordance with still another embodiment of the invention.
Figure 12:
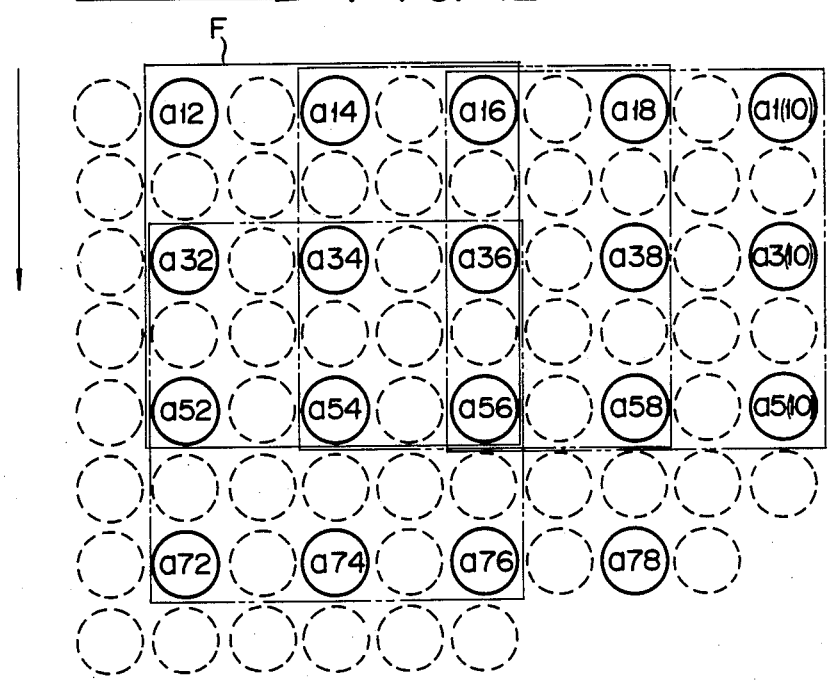
Figure 13:
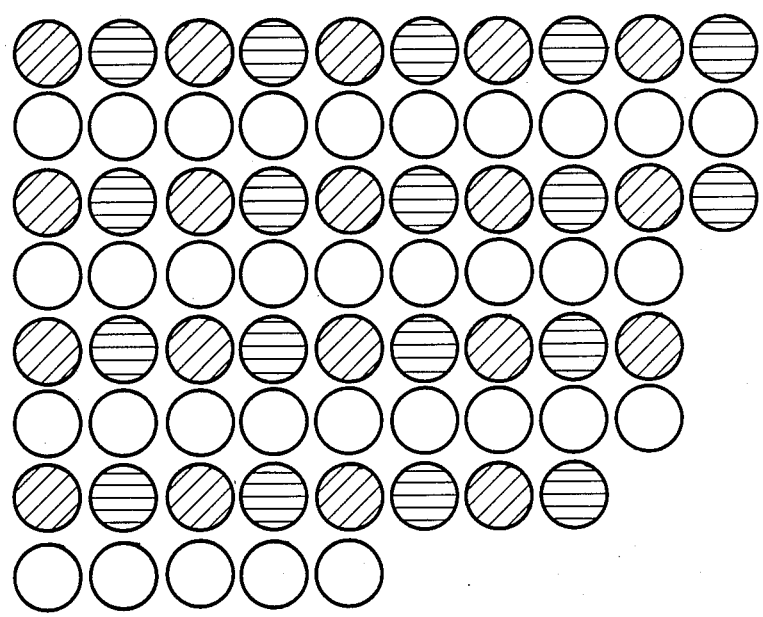
FIG. 13 is a view showing the formation of pattern resulting from the performance of the shift-reading operation in accordance with FIGS. 11 and 12.

According to a third embodiment illustrated in FIGS. 11, 12 and 13, the address computation is performed in accordance with the following formulae (5) and (6), whereby the odd-column and -row bit pattern section E and the even-column and -row bit pattern section F are picked up.

$$a\{(1+2i), (1+2j)\} \quad (5)$$

$$a\{(1+2i), (2+2j)\} \quad (6)$$

As with the pattern section A and C, the odd-column and -row bit pattern section E is sequentially detected while it is sequentially shifted in the horizontal direction X and vertical direction Y. In contrast, the even-column and -row bit pattern section F is sequentially shifted, from the position obtained by shifting the odd-column and -row bit pattern section E, by one bit-column, in the horizontal direction X, in the horizontal direction X as well as in the vertical direction Y. In this case, the CPU 19 supplies the i and j factors to the address computer 15, which effects the address designation of the pattern memory 14 so as to pick up the bit pattern sections E and F from the pattern memory 14. When all pattern sections possible with $256\times256$ bits are read out in accordance with the formulae (5) and (6), the formation of the pattern thus read out is, as shown in FIG. 13, such that the array of picture elements in the horizontal direction X, or the picture element rows, are arranged on every second row position of the formation. Since the detection of pattern position in such a pattern formation results in an alternately uniform picture-element distribution taken in the horizontal direction, it is possible to reliably detect the pattern components existing in the horizontal direction.

In the above-mentioned embodiments, the picking-up of the picture elements is effected with respect to every other picture-element column or row. However, the invention is not limited thereto but may permit this picking-up with respect to every second unit composed of two or more picture-element columns or rows. For example, where the picking-up of picture elements is effected with respect to every third picture-element column or row, the address computation is carried out in accordance with the following formulae (7), (8) and (9).

$$a\{(1+3i), (1+3j)\} \quad (7)$$

$$a\{(2+3i), (2+3j)\} \quad (8)$$

$$a\{(3+3i), (3+3j)\} \quad (9)$$

Figure 14:
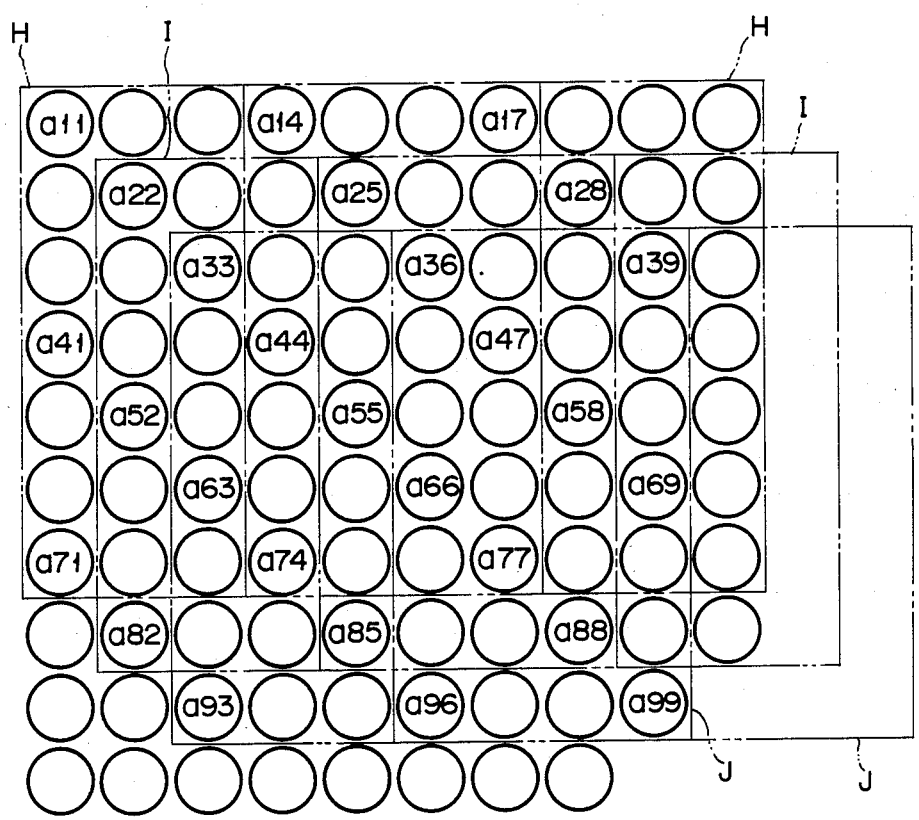
FIG. 14 is a view showing bit pattern sections H, I and J read out in accordance with a further embodiment of the invention.

When it is now assumed that a pattern section composed of $7\times7$ bits is formed, then as shown in FIG. 14 the first odd-column and -row bit pattern section H, first even-column and -row bit pattern section I, and second odd-column and -row bit pattern section J are each shifted in the horizontal direction as well as in the vertical direction.

Figure 15:
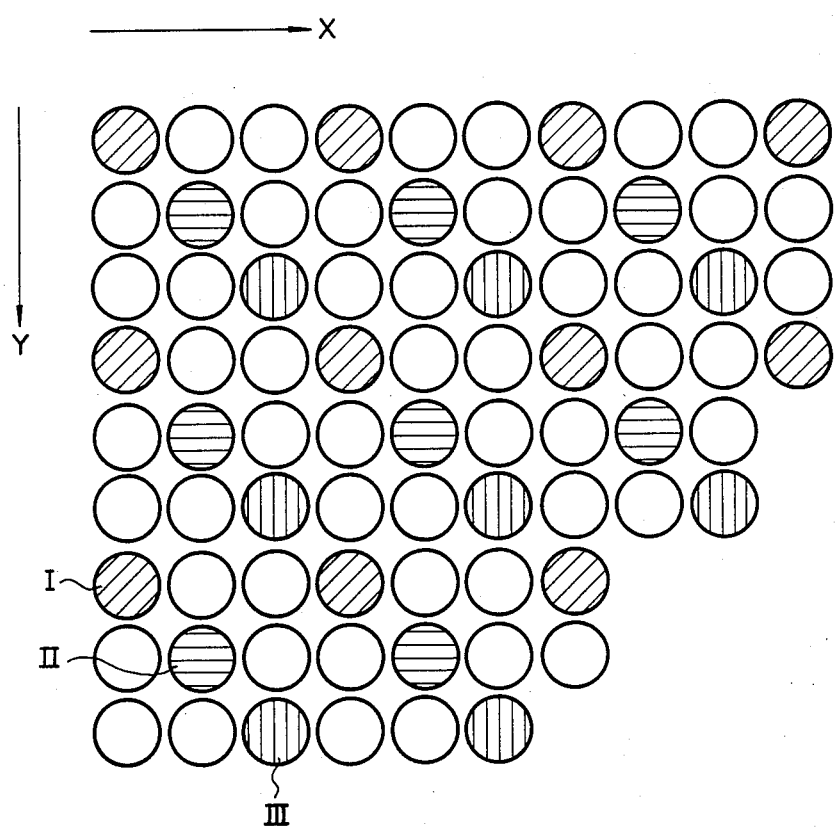
FIG. 15 is a view showing the formation of pattern resulting from the shift-reading operation in accordance with FIG. 14.

FIG. 15 shows a pattern prepared by picking up the picture elements with respect to every third picture-element column and row. In the pattern position detection according to this embodiment, the time required for position detection is one-third the time required for the prior art position detection, thereby enabling a further increase in the position detection speed.

As stated above, according to the invention, the means for addressing the pattern memory is provided for the purpose of reading out the pattern data corresponding to the picture element matrix from the pattern memory in such a manner that, in the picture element matrix corresponding to the pattern to be examined, a pattern section of specified region is sequentially shifted in both the horizontal direction and the vertical direction. This addressing means addresses the pattern memory so that the pattern section may be shifted at least every second picture-element array and so that the picture elements within this pattern section may be picked up at least every second picture element.

The addressing of the pattern memory is effected by the use of the addresses obtained by the address computation of the following formulae. Note here that the formulae are each intended to determine the address a in the picture element matrix and that each formula group differs depending upon the direction of movement of the initial address.

(1) The first formula group:

$$a = (1 + zi), (1 + zj)$$
$$a = (2 + zi), (2 + zj)$$
$$a = (3 + zi), (3 + zj)$$
$$\vdots$$
$$a = (z + zi), (z + zj)$$

(2) The second formula group:

$$a = (1 + zi), (1 + zj)$$
$$a = (2 + zi), (1 + zj)$$
$$a = (3 + zi), (1 + zj)$$
$$\vdots$$
$$a = (z + zi), (1 + zj)$$

(3) The third formula group:

$$a = (1 + zi), (1 + zj)$$
$$a = (1 + zi), (2 + zj)$$
$$a = (1 + zi), (1 + zj)$$
$$\vdots$$
$$a = (1 + zi), (z + zj)$$

where $z = R + 1$, R: the number of the columns or rows skipped over.

By the use of the pattern position detection apparatus of the invention, it is possible to increase the detection speed of the pattern position, thus remarkably shortening the time required for the pattern position detection.

In the above-mentioned embodiment, explanation is made such that, in the pattern section, the picture elements are picked up at least every second picture element in the horizontal direction. However, those picture elements may be picked up in the vertical direction.

In the above-mentioned embodiment, where the reading-out of the odd-column and -row bit pattern and the even-column and -row bit pattern is changed over, the formula of address computation is varied. However, this change-over can also be effected by changing over the least significant digit of the address to "H" level or "L" level. Or alternatively, the bit pattern may be read out by dividing the pattern memory into two memory sections, one of which is a memory section for the odd-column and -row bit pattern and the other of which is a memory section for the even-column and -row bit pattern and changing over one of these memory sections to the other.

What we claim is:

1. A pattern position detecting apparatus comprising:
   image pick-up means for receiving an image of a pattern to be examined and outputting an image signal corresponding to the pattern;
   memory means connected to said image pick-up means for storing all image signal components of said image signal, which are required for a pattern position detection, as examination pattern information constructed by pattern data bits corresponding to a picture element matrix;
   addressing means connected to said memory means for designating addresses of said memory means such that a pattern section including the bits of a specified number less than the number of the bits constituting said pattern information, is shifted at least two bits in any one of horizontal and vertical directions at a time and at least one bit in the other direction at a time, and reading out, for each shifting operation, said pattern data bits from said pattern section;
   reference pattern data outputting means for producing a reference pattern data corresponding to a target pattern and having the bits corresponding in number to the bits of said pattern section; and
   comparator means connected to said memory means and said reference pattern data outputting means for comparing the pattern data of said pattern section with said reference pattern data and for detecting the position of the target pattern from the degree of coincidence there between.

2. The pattern position detecting apparatus according to claim 1, wherein said reference pattern data outputting means is constituted by memory means having a plurality of memory sections which respectively store therein reference pattern data grouped into a plurality of groups corresponding in number to said memory sections.

3. The pattern position detecting apparatus according to claim 1, wherein said reference pattern data outputting means is constituted by reference pattern data memory means for storing therein a plurality of reference pattern data and addressing means for addressing said reference pattern data memory means for the purpose of reading specified reference pattern data from said reference pattern data memory means.

4. The pattern position detecting apparatus according to claim 1, wherein said addressing means carries out a first addressing operation for reading out odd-column and -row data bits and a second addressing operation for reading out even-column and -row data bits; and said comparator means detects the difference between the highest degree of coincidence obtained by comparing said odd-column and -row pattern data with the corresponding reference pattern data and the highest degree of coincidence obtained by comparing said even-column and -row pattern data with the corresponding reference pattern data and judges, when this difference is not smaller than a specified value, that the pattern data having a greater one of said highest degrees of coincidence is the target pattern and also judges, when said difference is less than said specified value, that the pattern corresponding to an intermediate position between the pattern data having said highest degrees of coincidence is the target pattern.

* * * * *